RECORD PERFORATION ANALYZING MECHANISM

Filed June 18, 1946 10 Sheets-Sheet 1

INVENTOR
Geo. F. Daly
BY
[signature]
ATTORNEY

RECORD PERFORATION ANALYZING MECHANISM

Filed June 18, 1946 10 Sheets-Sheet 2

INVENTOR
G. F. Daly
BY
W. M. Wilson
ATTORNEY

July 4, 1950 G. F. DALY 2,514,031

RECORD PERFORATION ANALYZING MECHANISM

Filed June 18, 1946 10 Sheets-Sheet 3

INVENTOR
G. F. Daly
BY
W M Wilson
ATTORNEY

RECORD PERFORATION ANALYZING MECHANISM

Filed June 18, 1946 10 Sheets-Sheet 4

INVENTOR
G. F. Daly
BY
W. M. Wilson
ATTORNEY

INVENTOR
G. F. Daly
BY
W. M. Wilson
ATTORNEY

July 4, 1950 G. F. DALY 2,514,031

RECORD PERFORATION ANALYZING MECHANISM

Filed June 18, 1946 10 Sheets-Sheet 6

INVENTOR
G. F. Daly
BY
W. M. Wilson
ATTORNEY

July 4, 1950 G. F. DALY 2,514,031

RECORD PERFORATION ANALYZING MECHANISM

Filed June 18, 1946 10 Sheets-Sheet 7

INVENTOR
G. F. Daly
BY
[signature]
ATTORNEY

RECORD PERFORATION ANALYZING MECHANISM

Filed June 18, 1946 10 Sheets-Sheet 8

INVENTOR
G. F. Daly
BY
W. McNeil
ATTORNEY

July 4, 1950 G. F. DALY 2,514,031

RECORD PERFORATION ANALYZING MECHANISM

Filed June 18, 1946 10 Sheets-Sheet 9

INVENTOR
G. F. Daly
BY
W. M. Wilson
ATTORNEY

July 4, 1950 G. F. DALY 2,514,031

RECORD PERFORATION ANALYZING MECHANISM

Filed June 18, 1946 10 Sheets-Sheet 10

INVENTOR
G. F. Daly
BY
W. M. Wilson
ATTORNEY

Patented July 4, 1950 2,514,031

UNITED STATES PATENT OFFICE 2,514,031

RECORD PERFORATION ANALYZING MECHANISM

George F. Daly, Endicott, N. Y., assignor to International Business Machines Corporation, New York, N. Y., a corporation of New York Application June 18, 1946, Serial No. 677,593

5 Claims. (Cl. 235—61.11)

This invention relates to record controlled machines and more particularly to improvements in the record perforation analyzing mechanisms therefor.

The main object of the invention is to devise and construct a record perforation analyzing mechanism utilizing flexible brushes, which enables a record to be analyzed in all perforated columns at rest and in an efficient manner.

Heretofore, record analyzing mechanisms also utilizing flexible analyzing brushes have been devised for this purpose but have been unsatisfactory because the brushes occasionally failed to make firm and efficient electrical contact with associated contact points through the perforations and resulted in the improper operation of the record controlled machine.

The purpose of this invention is to devise an arrangement and to construct it in such a manner that all previous objections are overcome and provide for efficient electrical contact, thus insuring the proper operation of the record controlled machine.

One feature of the invention relates to the manner of constructing the analyzing units by means of which they can be mounted and carried by a metal plate. An associated feature relates to the manner of mounting such metal brush carrying plates in a brush carrying frame so that they are assembled on said frame insulated from each other.

Another object of the invention relates to the means for locking the analyzing units in position on the brush carrying frame and in such manner that they can be removed with facility from the frame for the purpose of service, repairs, adjustment and inspection.

Another object of the invention is the provision of a card feeding unit of a two-part construction comprising the base section and the upper hinged portion. The brush carrying frame is mounted in the upper hinged portion, whereby the turning over of this portion enables the brush carrying units to be inspected for the purpose of service and adjustment.

Another object of the invention is to provide means to depress the brush carrying frame at four points with equal force to exert the same pressure upon all of the brushes to thereby insure that they will be flexed with the same force against the card surface.

More specifically, this is attained by a parallelogram linkage which supports the brush carrying frame. The parallelogram linkage has operating connections to the main operating means at the lower base portion of the machine. At a timed operation of the machine the parallelogram linkage is rocked to depress the brush carrying frame.

In the present preferred construction, the depression of the brush carrying frame causes each brush to travel downwardly toward the top surface of the card in a straight line which, however, is angular with respect to the center line of the card hole. As the brush strikes the surface of the card or a contact point, it will be flexed to increase the resilient action of the brush and cause the brush strands to make firm contact with the contact point through a hole if one should be sensed.

Another object of the invention is to provide means to effect an additional movement of the brush carrying frame which will wipe the brush over the contacting contact point to clean the latter and make good contact. This additional movement results in a final position of the analyzing brushes in which all of the strands of the brushes still pass through the holes to make the desired efficient electrical contact.

Another object of the invention is to employ a brush which consists of two groups of wires which can flex and move independently of each other. This further insures the desired efficient electrical contact in the downward movement and in the lateral wiping movement of the of the brushes.

Another object of the invention relates to the provision of means which clamps the card to be analyzed against the card bed of the unit. This clamping of the card takes place just slightly before the brushes strike the surface of the card. Holding the card clamped in this manner prevents buckling or improper shift of the card from the desired analyzing position. This clamping means is especially useful in view of the additional wiping movement of the analyzing brushes, since it is obvious that their contact with the surface of the card and wiping movement would tend to shift the card against certain card stops employed in the machine. This force is considerable and would buckle or shift the card. The clamping means provided herein prevents such undesired movement and is a feature which augments the efficient electrical analysis of the card.

Other objects of the invention, which will be noted particularly as the specification is understood, also pertain to the construction of the card analyzing unit which provides for the desired efficient electrical analysis of the card.

Throughout the design, the main object has been to devise a card analyzing unit which in coordination with a card feeding unit shown and claimed in the application of G. F. Daly, Serial No. 629,576, filed November 19, 1945, now Patent No. 2,510,559, enables the efficient analysis of cards at rest when such cards are fed at an increased rate effected by said card feeding unit.

Other objects of the invention will be pointed out in the following description and claims and illustrated in the accompanying drawings, which disclose, by way of example, the principle of the invention and the best mode, which has been contemplated, of applying that principle.

Figure 7A:
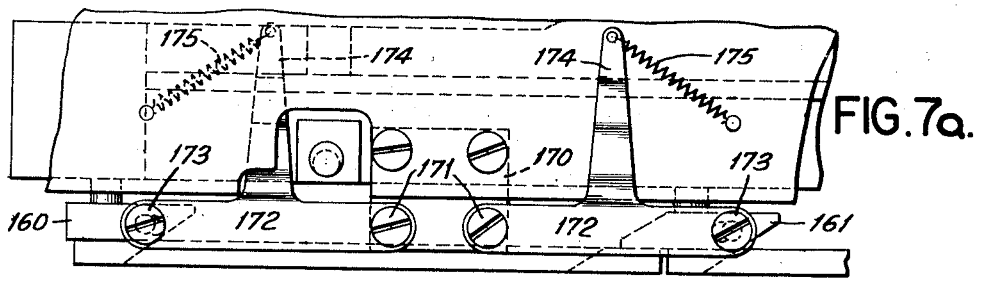
Fig. 7 is a transverse sectional view taken on the line 7—7 of Fig. 1.

Fig. 7*a* is a detail view of the resiliently operated means to actuate the pressure plate.

Figure 1:
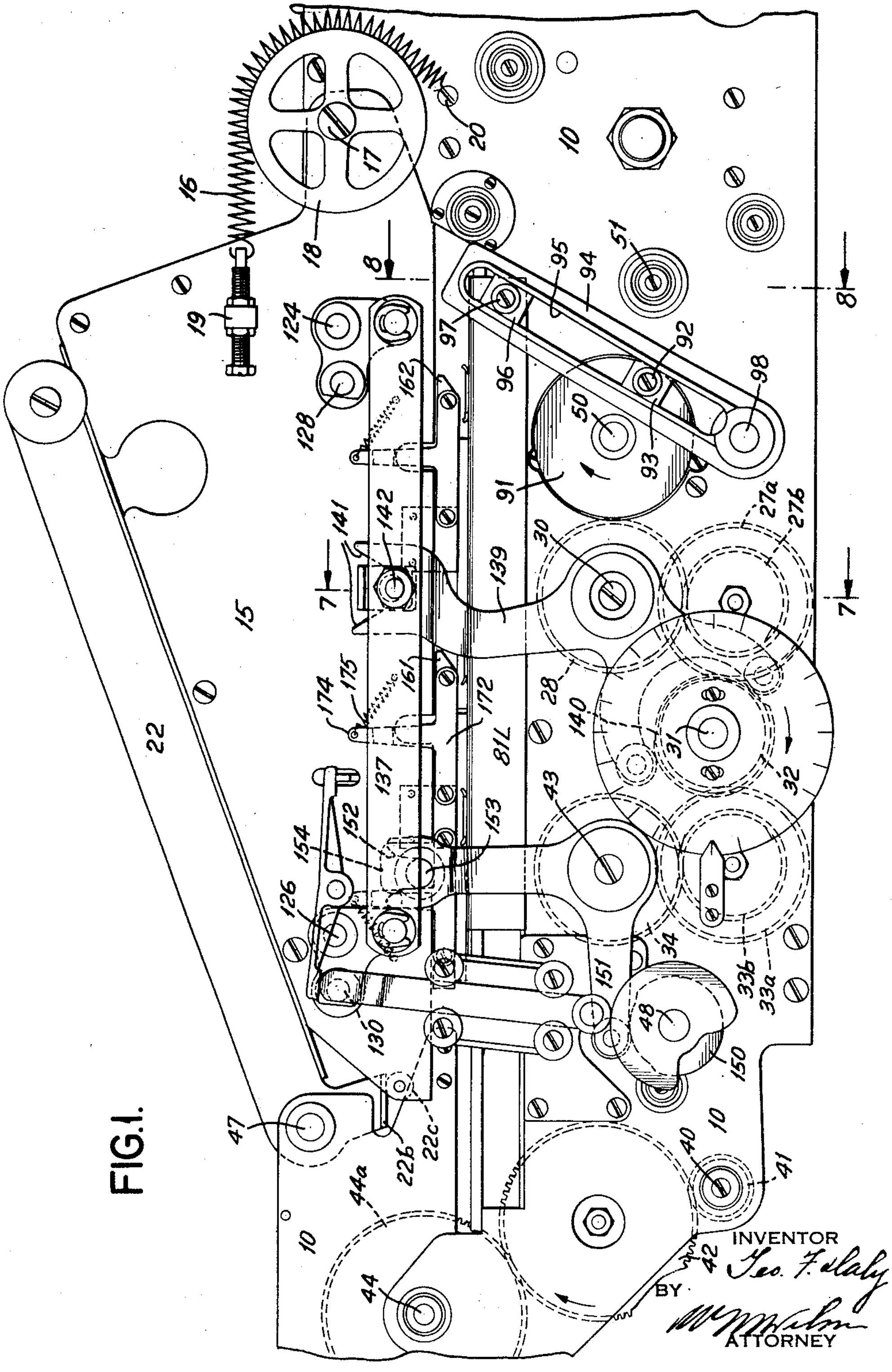
Fig. 1 is a left outside elevational view of the card feeding unit.
Figure 8:
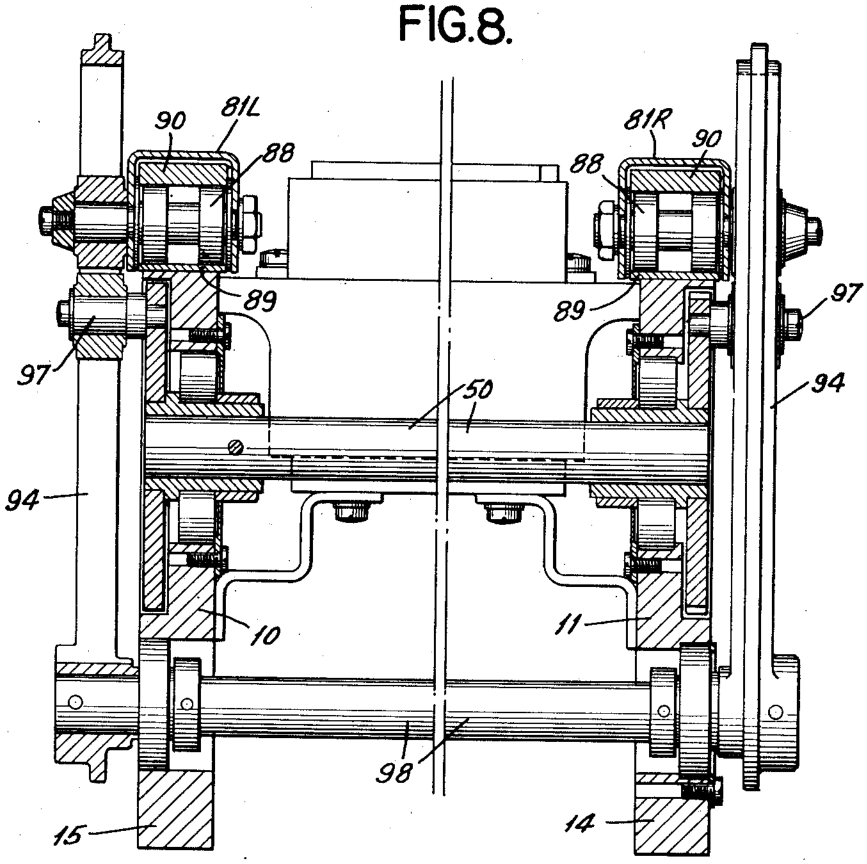

Fig. 8 is a transverse sectional view taken on the line 8—8 of Fig. 1.

Figure 9:
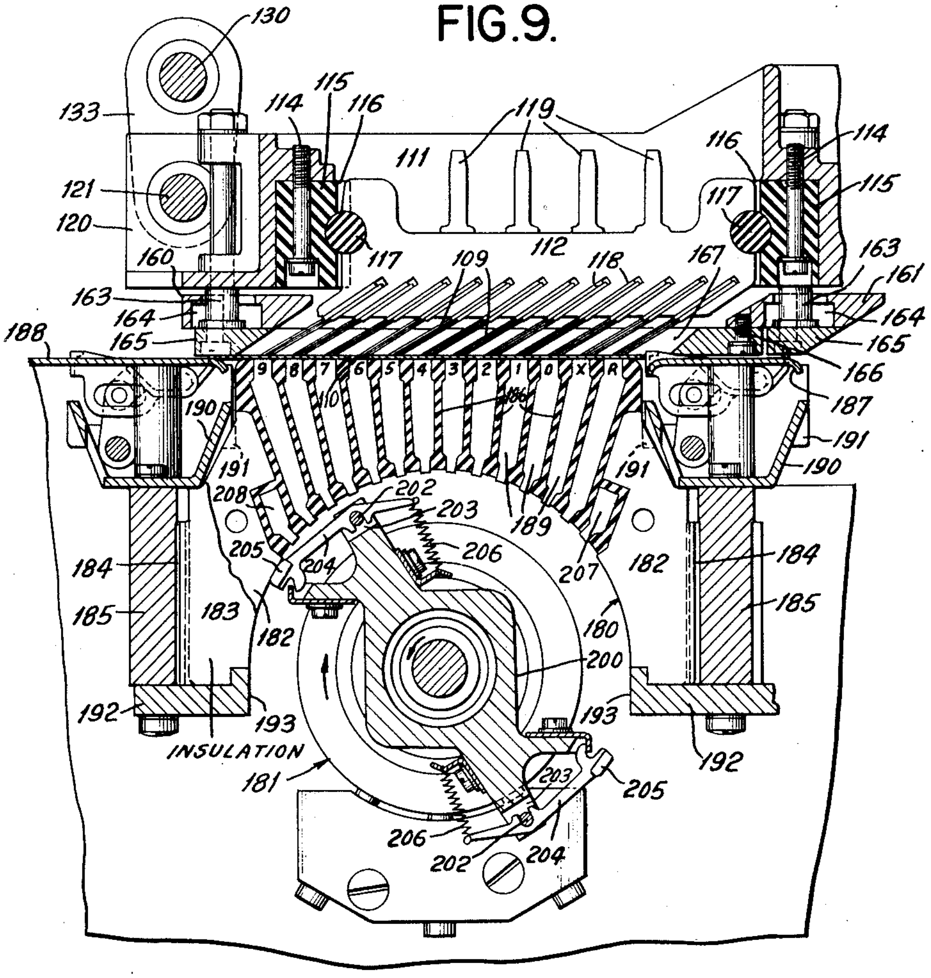

Fig. 9 is a longitudinal sectional view taken through one analyzing station and shows particularly the operative and structural association of the brush carrying frame, analyzing unit and related sensing commutator unit.

Figures 9A, 9B, 9C:
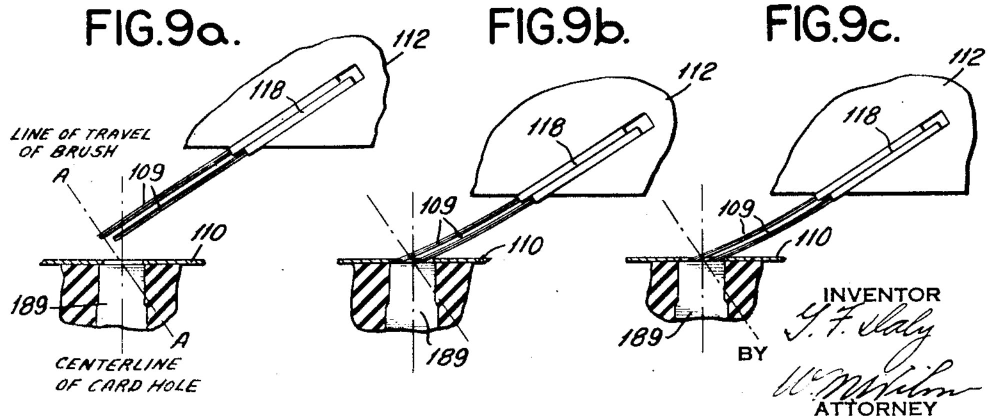

Figs. 9*a*, 9*b* and 9*c* are diagrammatic views showing the successive positions of an analyzing brush and the manner of movement to analyze the card perforation.

Figure 10:
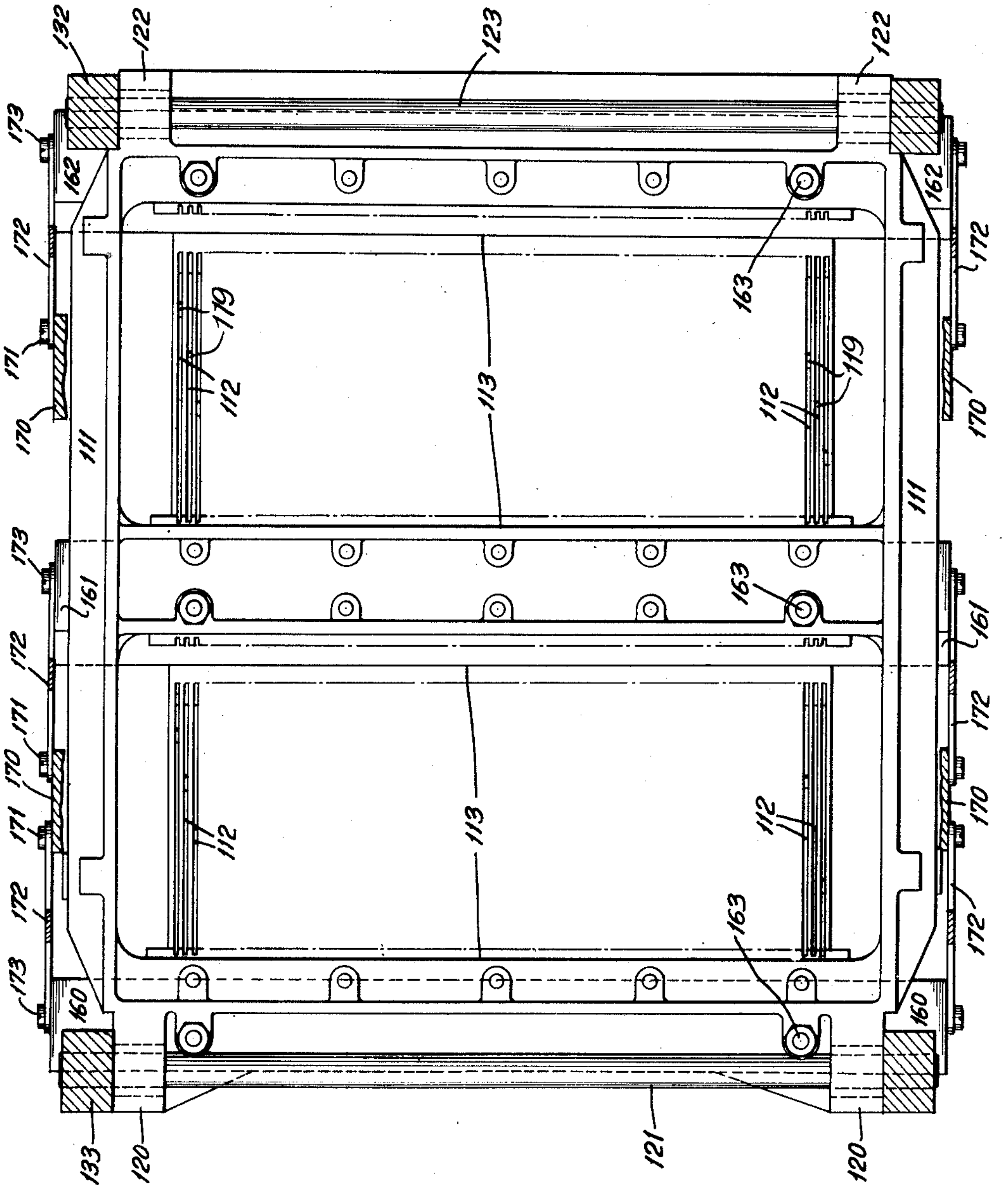

Fig. 10 is a plan view of the brush carrying frame with some of the brush units shown assembled therein and also showing parts of the clamping means carried by said frame.

Figure 11:
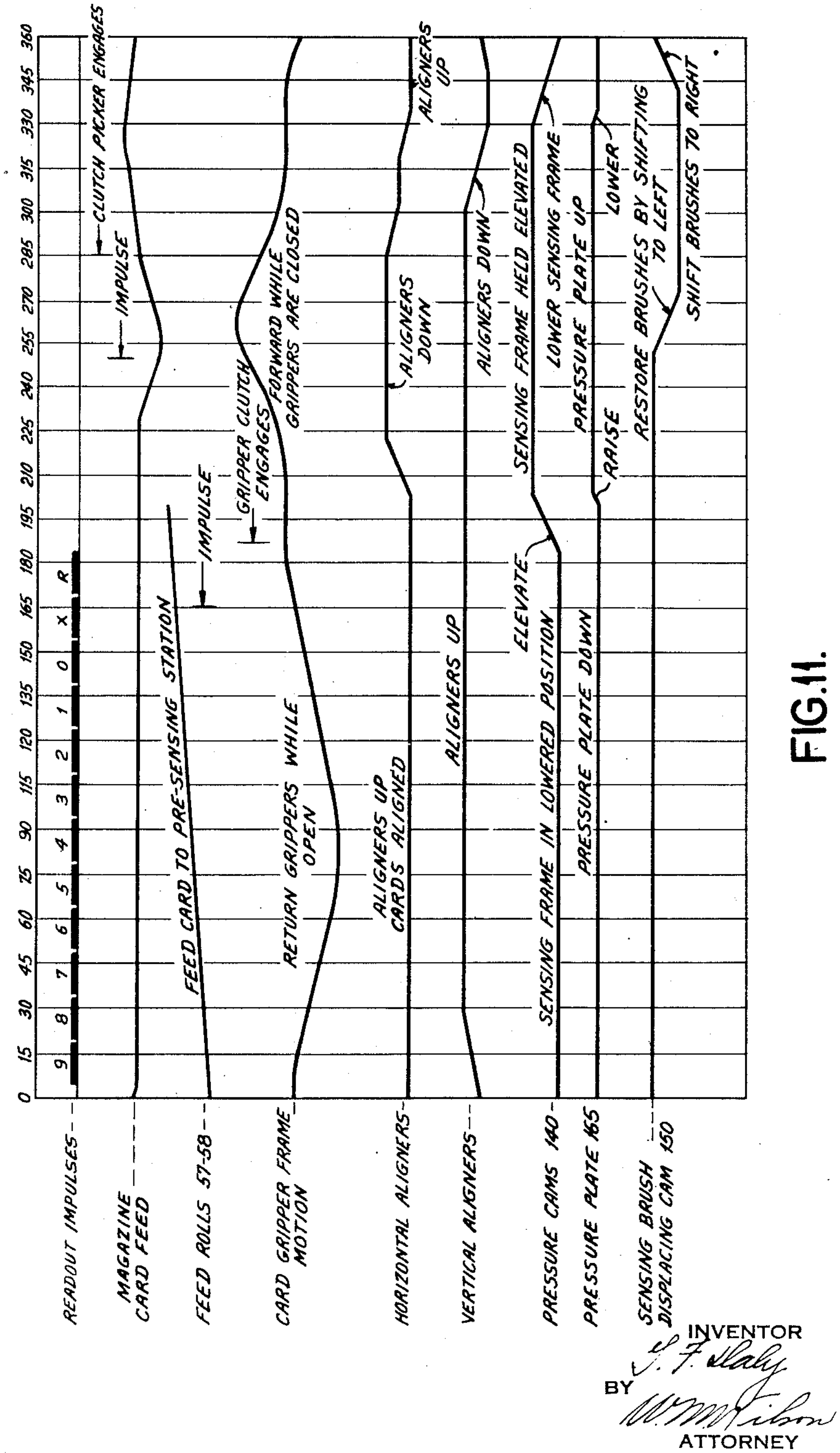

Fig. 11 is a timing diagram which can be followed to understand the timing of the various operations of the mechanisms shown herein.

The arrangement for feeding cards is substantially the same as shown in the application of G. F. Daly, Serial No. 629,576, filed November 19, 1945. Herein a description is given of the card feed unit and in enough detail to be sufficient to understand the present invention comprising the card analyzing structure.

*Framework*

In general, the card feeding and analyzing unit consists of a lower or bottom section mounted upon the intermediate base of the card controlled machine, and an upper section hinged to the lower section which primarily carries the brush supporting frame.

The framework for the bottom or lower section of the unit includes a pair of spaced side frames 10 and 11 (Figs. 1, 2 and 4) which carry, among other parts, the bearings in which operating shafts to be subsequently described are journalled. The framework of the upper section consists of side frames 14 and 15, suitably spaced by cross members which includes a plate 13 which is one wall of the card supply magazine 25 (see Fig. 3). The upper framework is hinged to the lower section on a pair of studs 17 (Figs. 1 and 2) so that the upper section may be rocked about the studs 17 to obtain access to parts in the lower section of the unit and also to the upper section.

Preferably the upper hinged unit is counterbalanced by springs 16 which partially encircle wheels 18 pivoted on studs 17 and are anchored at 19 and 20 to the upper and lower sections of the unit respectively. The springs 16 maintain the upper section in any desired position of adjustment.

The card storage magazine 23 (Fig. 3) comprises a base plate 21 and two slotted side plates 22, each of which is pivoted on a stacker drum shaft 47. Shaft 47 is pivoted in side plates 10 and 11 and thus the storage magazine is pivoted about the lower section. The storage magazine 23 receives cards fed by the stacker drum after such cards have passed through the machine to be analyzed to control customary functions in the card controlled machine. To obtain access to the lower section the card storage magazine 23 is first rocked counterclockwise (Fig. 1) about shaft 47, removing it from the upper section which is now free to be rocked clockwise about studs 17. The reverse procedure is followed when the unit is reclosed and the normal downward position of the upper section is insured by having a foot cam portion **22*b* (see Fig. 1) of each side plate 22 engage a related roller 22*c* which is carried by the rear end of the related side plates 14 and 15. The pressure and cam action on rollers 22*c*** force the upper section to normal downward position by the act of restoring the storage magazine to the Fig. 1 position.

Suitable side plates 24 (Fig. 3) together with the cross plate 13 provide a card supply magazine 25 from which cards are fed singly for their presentation to the analyzing stations to be subsequently described.

The power for driving the card feeding unit is derived from a main drive shaft 30 (Figs. 1, 2 and 4) which is a continually operating shaft of the machine which turns one revolution per cycle.

Figure 2:
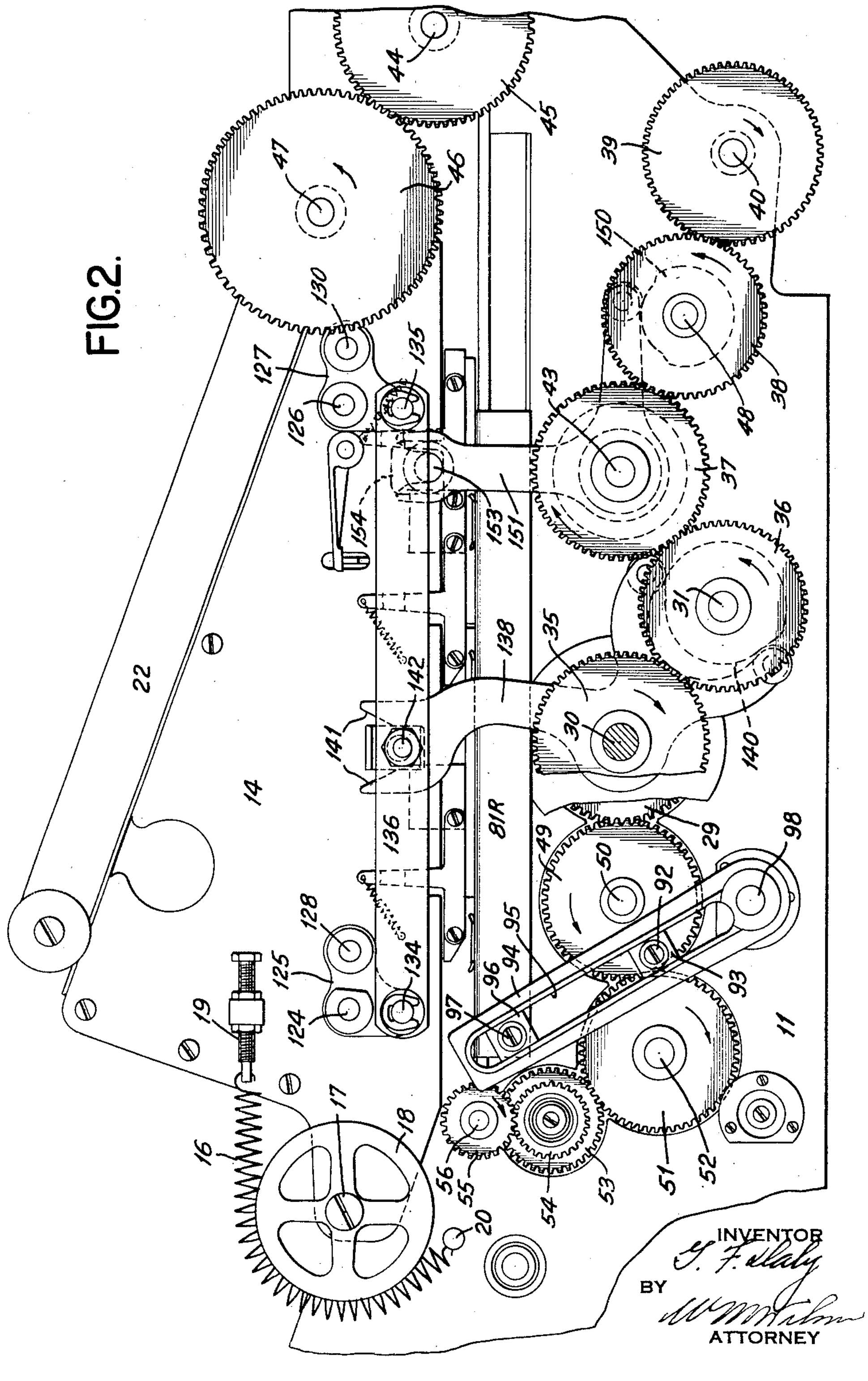
Fig. 2 is a view similar to Fig. 1 but is an outside elevational view of the right side of the unit.
Figure 4:
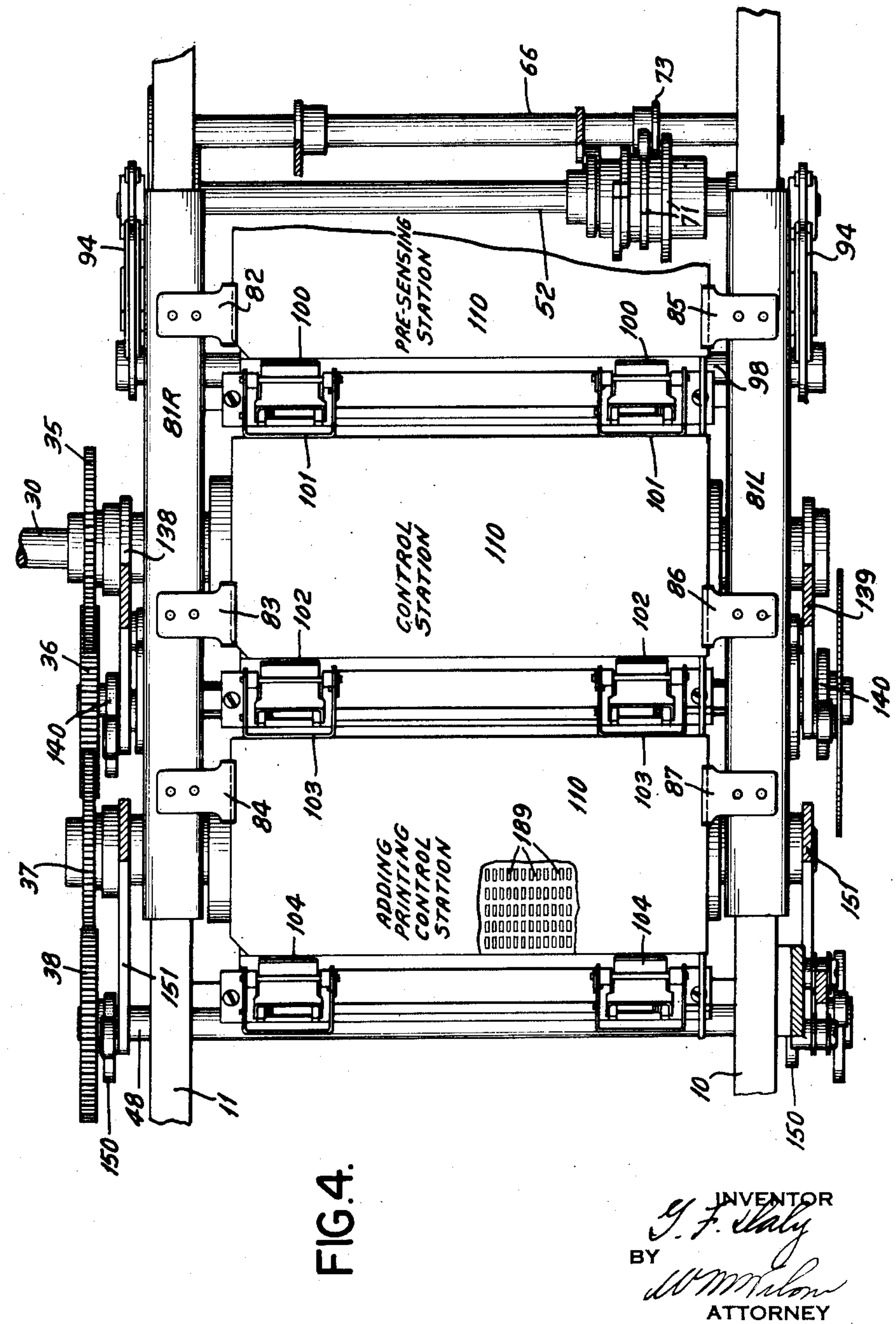
Fig. 4 is a plan view with the upper hinged section of the unit removed and fragmentary in portions to show more clearly the parts which would be concealed.

Shaft 30, referring to Figs. 2 and 4, has secured to it a gear 35 which meshes with a gear 36 fixed to shaft 31. Shaft 31 is a cam drive shaft. Gear 36 meshes with a gear 37 fixed to the shaft 43 and the latter meshes with a gear 38 secured to a cam drive shaft 48, the shafts 30, 31, 43 and 48 each being driven one complete revolution per cycle. Gear 38 meshes with a gear 39 (Fig. 2) secured to a transverse shaft 40, said shaft carrying on its other end (see Fig. 1) a pinion 41 which drives a gear **44*a* secured to a shaft 44 through an idler gear 42. Referring to Fig. 2 secured to shaft 44 is a gear 45 meshing with a gear 46 secured to the stacker drum drive shaft 47. It should be noted that stacker drum drive shaft 47 is journalled in the side frames 10 and 11** of the lower section of the card feeding unit.

To shaft 31 (Figs. 1 and 7) and inside the frame 10 there is secured a gear 32 meshing with a gear **27*a* and to the latter there is secured a gear 27*b* in mesh with a gear 28 secured to a bearing supported sleeve 28*b* on drive shaft 30. Gear 32 meshes with a gear 33*a* to which is attached a gear 33*b* in mesh with a gear 34 secured to another similar sleeve supported by a shaft 43. Through this gearing, commutator drive castings 200** are driven one-half revolution per cycle in reverse direction of supporting shafts 30 and 43.

Figure 5:
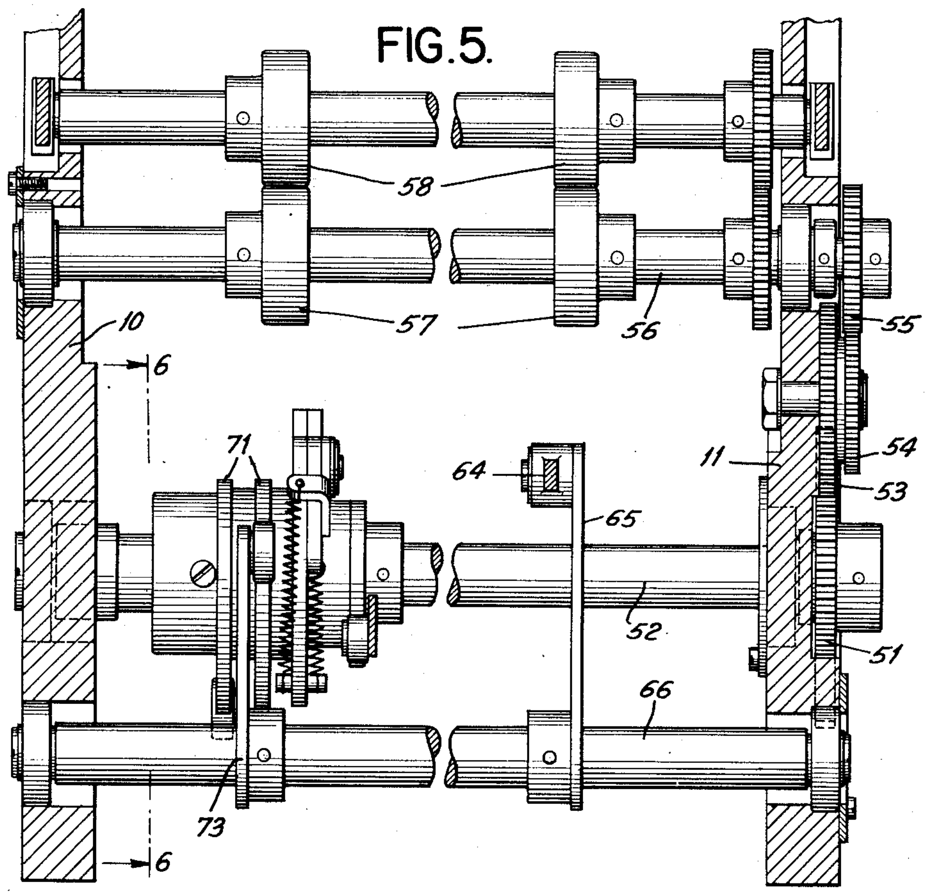
Fig. 5 is a transverse sectional view taken on the line 5—5 of Fig. 3.

Gear 29 secured to shaft 30 (Figs. 2 and 7) meshes with a gear 49 which is secured to a drive shaft 50 and gear 49 is in mesh with a gear 51 secured to a clutch drive shaft 52 (see also Fig. 5). Gear 51 drives a gear 53 to which is attached a gear 54 meshing with a gear 55 secured to the lower feed roll shaft 56. The drive shaft 56 carries the lower feed rolls 57 and cooperating with the feed rollers 57 are gear driven feed rollers 58. From Fig. 3 it will be seen that feed rollers 57, 58 are positioned adjacent the throat of the card supply magazine 25 so that the cards which emerge from the card supply magazine pass through the throat and are received by the rollers 57 and 58 which feed them to the presensing station.

*Card feed from supply magazine*

A conventional card picker is provided to feed cards singly from the supply magazine and includes a card picker 59 (Fig. 3) having a swivel mounting on a slidably mounted rack 60, all of which parts are carried by the lower section of the card feeding unit. Said rack 60 is operated by a segment arm 61 secured to a rocker shaft 62. To the rocker shaft 62 there is secured a depending arm 63 which has a link connection 64 to an arm 65 secured to a rocker shaft 66.

Figure 6:
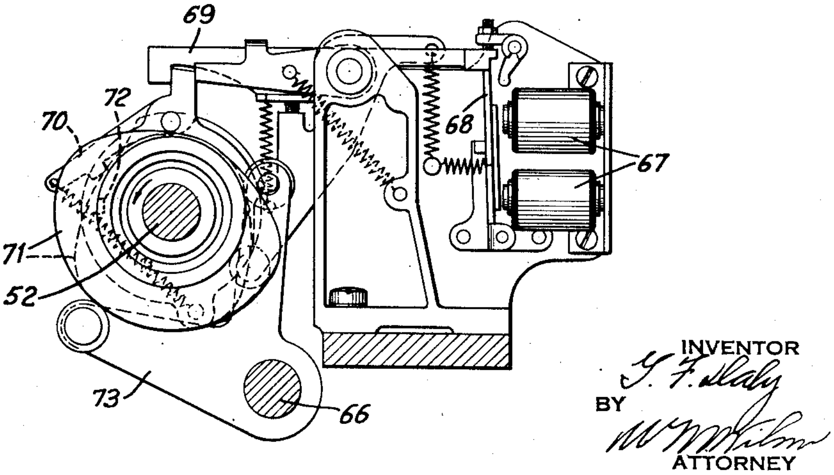
Fig. 6 is a detail of the clutch which is engaged to initiate card feed from the supply magazine. The view is taken on the line 6—6 of Fig. 5.

To effect selective card feed operations there is provided a one-revolution clutch which is controlled by a card feed clutch control magnet 67 (Fig. 6). As in the well known construction the armature 68 thereof rocks a clutch release arm 69 which enables a pawl 70 pivoted on a member secured to complementary cams 71 which are loose on the clutch drive shaft 52 to engage a notch formed in a disk 72 secured to the one-revolution drive shaft 52. When such clutch engagement is effected shaft 52 will drive the complementary cams 71 a complete revolution. Cooperating with the complementary cams is a follower arm 73 secured to the rocker shaft 66. Rocking of said shaft by the complementary cams 71 will, through the mechanical linkage just described, reciprocate the picker to feed a card from the magazine.

By electrical circuits fully shown in the application of G. F. Daly, Serial No. 629,576, an impulse is transmitted to the clutch control magnet to cause the clutch engagement and feeding of the lowermost card to the constantly rotating feeding rollers 57, 58. Such rollers feed the card from the beginning of the cycle up to about 200° of the machine cycle (see Fig. 11) to feed the card to the first sensing station known in the present machine as a "Presensing Station." If a card reaches such station, further card feed operations are effective by grippers so as to feed the card to the first card analyzing station.

This station is designated a presensing station because it has at such station a card operated lever and associated contacts for controlling the ensuing card feed operations dependent upon feeding of a card to this station.

*Stacker drum*

After the card has been analyzed at both analyzing stations it is received by a stacker drum 74 (Fig. 3) of a conventional construction and since its construction and operation is well known it will only be generally stated that such stacker drum 74 receives a card, turns it over, and deposits it in the card storage magazine 23 and in the same order that the cards are originally stacked in the supply magazine 25.

*Card gripping devices*

As fully shown and explained in more detail in the application of G. F. Daly, Serial No. 629,576, filed November 19, 1945, cards are positively moved from station to station without the use of the customary feeding rollers and is preferably performed by the use of card gripping devices. Reference has been made to the so-called "Presensing Station" and by a control disclosed in the aforementioned application the presence of a card at such station enables the closure of the grippers to seize each card at opposite marginal edges and effect reciprocation of the gripper frames to feed the card to the next station or to the stacker drum (see timing, Fig. 11). The first station has been designated as the "Presensing Station" (see Fig. 4); the second is known as the "Control Station" which is used for control purposes in a customary card controlled accounting machine and the third station designated as the "Adding Printing Control Station," having the function designated by this legend.

Figure 3:
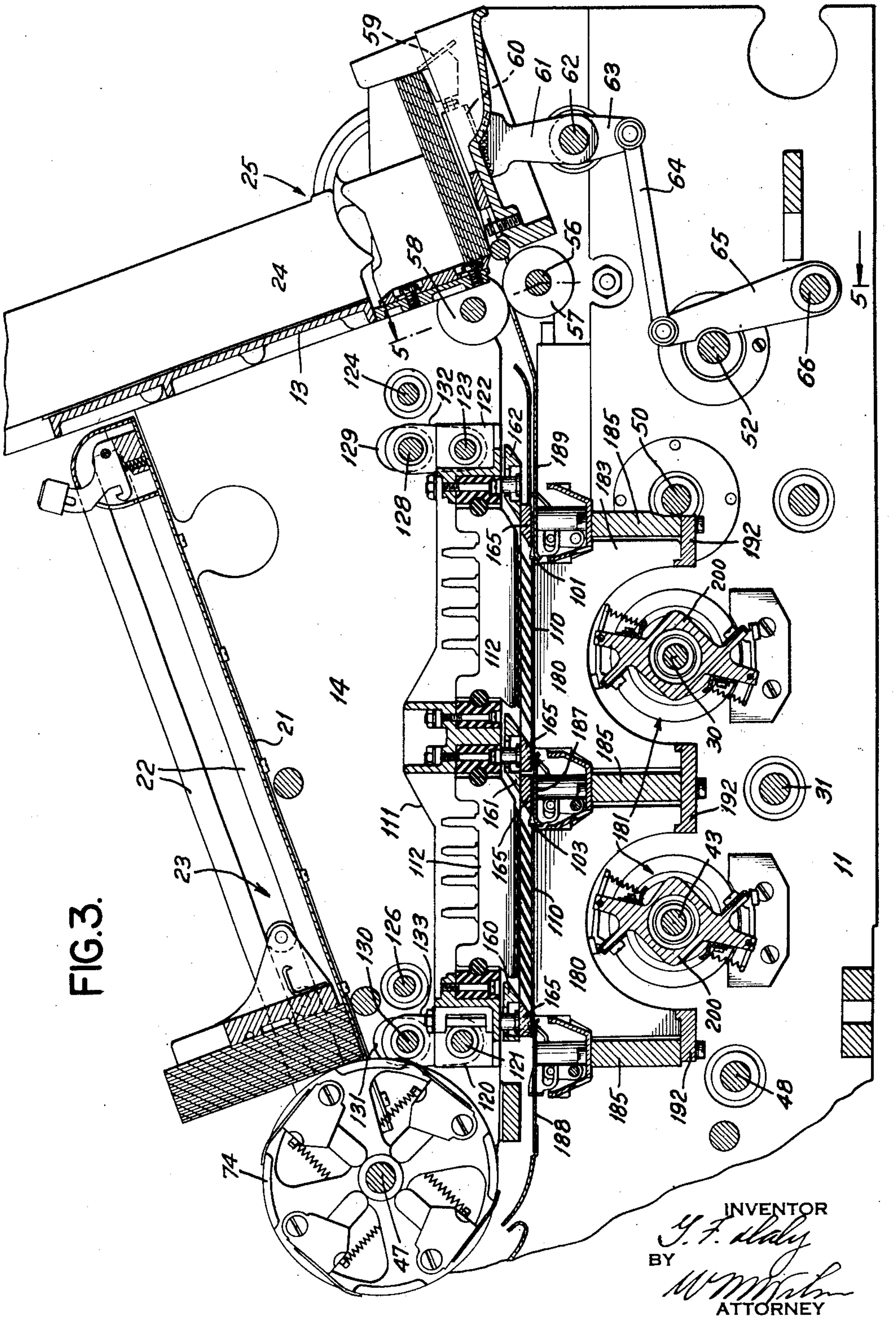
Fig. 3 is a central longitudinal sectional view of the unit.

In view of the detailed disclosure in the aforementioned Daly application, Serial No. 629,576, it is thought unnecessary to give a detailed description of such card gripping feeding devices. In general, there is provided at the right side of the card feeding unit in the lower section a reciprocable gripper frame 81R (Figs. 2 and 4) carrying card grippers 82, 83 and 84. At the other side of the machine the companionate reciprocable gripper frame 81L (Figs. 1 and 4) carries grippers 85, 86, 87. Obviously, from Fig. 4 grippers 82 and 85 feed the card from the Presensing Station to the Control Station and simultaneously grippers 83 and 86 (see Fig. 7) move a card from the latter designated station to the Adding Printing Control Station and grippers 84 and 87 feed a card from the Adding Printing Control Station to the stacker drum 74 (Fig. 3).

When three cards are at their respective stations the concomitant movement of the gripper frames 81R and 81L will feed three cards during the same machine cycle.

Figure 7:
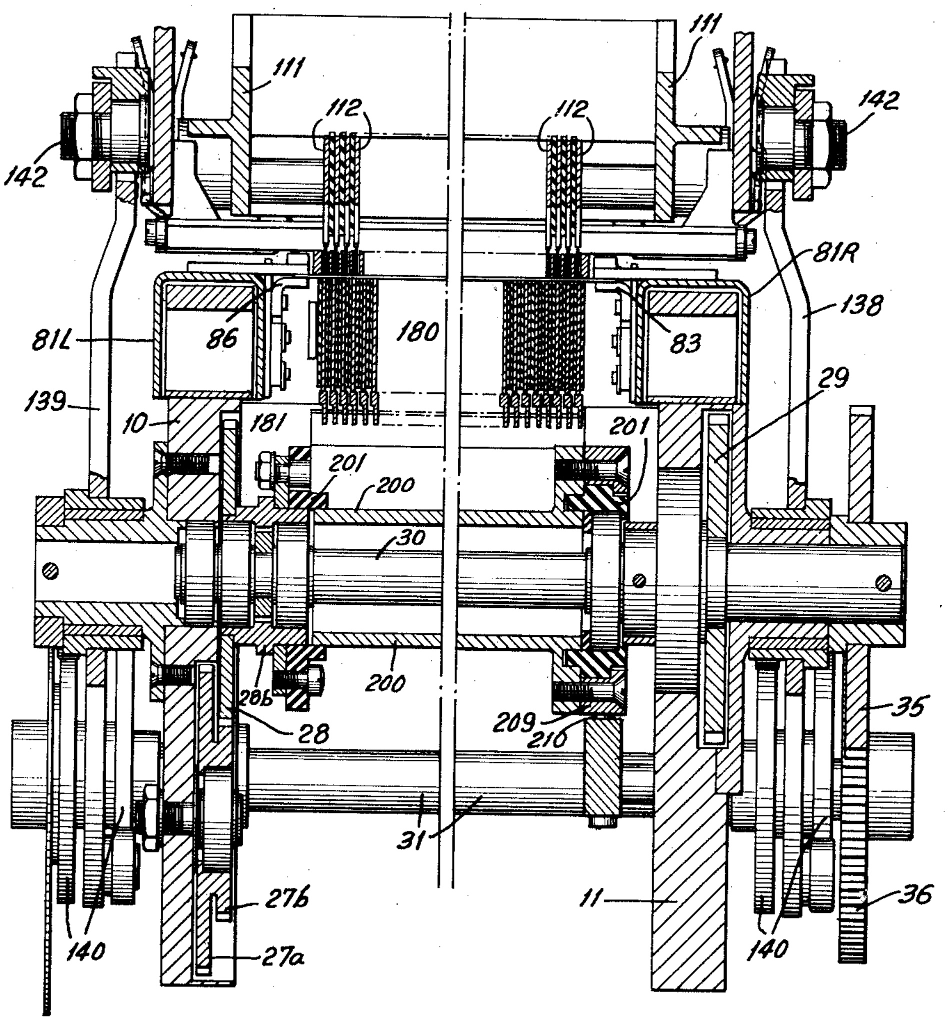

As best shown in Fig. 8, each gripper frame 81L or 81R consists of a U-shaped frame carrying ball bearing mounted wheels 88 which roll over a lower track 89 and underneath an upper track 90 carried by the side plates of the lower section. As previously stated, when cards are to be fed from station to station, the grippers carried by the frames are simultaneously released, that is, they close upon themselves to seize the marginal edge of the card as shown in Fig. 7 for grippers 83, 86 to cause the cards to be fed to the next position as the gripper frames are moved. When the cards are in the next position the grippers are then opened and the gripper frames are returned idly to normal position. The means for reciprocating the gripper frames to the left in a card carrying stroke and to the right in an idle stroke is shown in Figs. 1 and 2. Such reciprocation is effected by the shaft 50.

Referring to Figs. 1 and 2, both the gear 49 and a disk 91 which are secured to the shaft 50 carry a pin 92 which supports a rectangular shoe 93 which is guided in a crank arm 94 so as to ride in a slot 95 therein. Also slidable in the slot 95 is a similar shoe 96 supported by a pin 97 carried by the respective gripper frame 81L or 81R. Arms 94 are both connected to a shaft 98 to effect their simultaneous movement.

Figs. 1 and 2 show the parts just described in a position they occupy at the start of a card transporting stroke. Based upon the assumption that a card has been fed to the Presensing Station, the grippers will close upon themselves to seize the marginal edges of the cards and the rotation of shaft 50 will move the gripper frames 81L and 81R with a quick feeding stroke which is terminated about 323° or near the end of the cycle (see Fig. 11). Thereafter, the grippers are opened and a slow return of the gripper frames then moves the open grippers back to normal position.

It is obvious, therefore, that at the beginning of a machine cycle, cards have been fed to the respective control stations for analysis of perforations therein.

It is to be understood that during the operation of the machine the gripper frames constantly reciprocate once for each machine cycle since drive shaft 50 is constantly turning. The closure of the grippers is, however, dependent on the presence of a card at the Presensing Station.

*Card stops and aligners for horizontal edges of cards*

Also as more fully described in the application of G. F. Daly, Serial No. 629,576, filed November 19, 1945, the card feeding unit shown herein is provided with means to align the card along the horizontal edges to accurately correlate the horizontal rows of index points of the cards with the related rows of analyzing brushes.

In general, at the Presensing Station P the card is aligned between the bight of the feed rollers 57 and 58 and two aligners 100 (see Fig. 4). The card at the Control Station is aligned between card stops 101 and aligners 102 and the card at the Adding Printing Control Station is aligned between the card stops 103 and aligners 104.

The card stops 101 and 103 cooperate with the trailing horizontal edges of the cards at the Control Station and Adding Printing Control Station and comprise a bail plate which is urged downwardly against the action of a spring as the card is being fed by the grippers. When the trailing edge passes by the card stops, said stops are spring-urged upwardly to present a square aligning surface to the trailing edge.

The aligners 100, 102 and 104 are, however, movable to the right and upwardly so as to shift the related card to the right to correct the overfeeding of the cards purposely given thereto. As fully described in the aforementioned Daly application, these aligners are normally below the plane of the cards as they are being fed by the grippers. When the cards have been fed to the respective stations and have been released by the opened grippers, the aligners 100, 102 and 104 are thereupon moved to the right and at the same time upwardly so as to coact with the leading edge of the respective card. This will shift each card to aligned position to accurately align the rows of analyzing brushes with the rows of index points.

*Vertical card edge aligners*

Also as fully shown and described in the aforementioned Daly application, the machine is provided with vertical card edge aligners which are disposed at the Control Station and the Adding Printing Control Station. These coact with the vertical or shorter edges of the card so as to shift the card whenever there is any deviation of the card from its proper line or direction of feed. These aligners are not shown herein but it is to be assumed that to accurately analyze the card perforations they are preferably included in the machine and are preferably of the structure shown and described in the aforementioned Daly application.

*Card analyzing mechanism*

The card analyzing mechanism forming part of the present invention is particularly useful in card controlled machines wherein cards are analyzed at rest.

The analyzing mechanism has been devised for efficient electrical analysis of the type of perforated card shown in the patent to C. D. Lake, No. 1,772,492, granted August 12, 1930. In general, the card 110 of the outline shown in Fig. 4 has perforations which are rectangular in shape and are arranged in eighty vertical columns and in twelve horizontal rows through which perforations electrical circuits are made under control of the card analyzing mechanism to control functions of the machine.

The plurality of brush analyzing units 112 are carried by a frame 111 which comprises a single metallic casting machined to form the configuration shown in plan in Fig. 10 and in section in Fig. 3. The member 111 is formed so as to be capable of mounting the analyzing units 112 (see Fig. 9). At each analyzing station the frame 111 carries a plurality of brush carrying analyzing units 112 which are metallic but mounted to be insulated from each other. For each analyzing station there are eighty analyzing units 112 and such units are mounted to pass through rectangular openings 113 formed in the frame member 111. By means of mounting screws 114 (Fig. 9) transverse bars 115 of insulating material are carried by the frame 111 and such bars are formed with slots 116 which receive the analyzing units 112 in such manner that they are spaced apart from each other. The set of eighty analyzing units 112 for each analyzing station are, therefore, mounted to project through the rectangular openings 113 and when so mounted they are locked in position by means of rods 117 of insulating material. Rods 117 fit in semi-circular cutout portions formed at the ends of the analyzing units 112 and along the edge of each spacing bar 115.

The specific construction of the analyzing units is best shown in Figs. 9 and 9*a* wherein it will be noted that the analyzing unit is slotted angularly to receive the ferrules 118, each of which has secured therein two groups of analyzing brushes, each group consisting of four wires 109. The group arrangement of analyzing brushes is similar to that shown in the patent to M. F. Hayes, No. 2,129,764 and permits movement of one group of wires independent of the other. The terminal ends of the analyzing brushes are ground square so as to provide a straight edge to enable efficient electrical contact with a contact member to be subsequently described.

Referring to Fig. 9 each analyzing unit 112 has an upstanding extension 119 and for eighty analyzing units the projections 119 are disposed in four staggered groups so as to enable selective wire connections or sliding contact to such extensions 119 without interference. The analyzing brushes 109 are inclined in the direction of feed of the card as shown in Fig. 3 and the two sets of eighty units are all pressed down each with a straight line motion traveling on the line A—A of Fig. 9*a*. The analyzing brushes are normally elevated out of contact with the cards while the cards are being fed by the grippers to analyzing position. When the cards are in analyzing position the analyzing frame is depressed during the time that the gripper frames are being idly restored. The means for depressing the analyzing frame 111 is best shown in Figs. 1, 2, 3, 9 and 10.

The analyzing brush carrying frame 111 is carried by the upper portion of the card feeding unit and is mounted between side plates 14 and 15 in the following manner:

At one end of the frame 111 ears 120 (Fig. 10) carry a rod 121 and at the other end ears 122 carry a rod 123.

Referring to Fig. 2 pivotally mounted on a rod 124 carried by the side frames 14 and 15 but outside of frame 14 is a bell crank 125. Also mounted on a rod 126 carried by the side frames 14 and 15 but outside the frame 14 is a bell crank 127. Bell crank 125 carries one end of a rod 128 which, as shown in Fig. 3, passes through an elongated slot 129 in the side frame 14. The bell crank 127 carries a rod 130 which, as shown in Fig. 3, passes through an elongated slot 131 in the side frame 14. Between the rod 123 and the rod 128 there is a link connection 132. Between the rod 130 and the rod 121 there is a link connection 133. Referring to Fig. 2 bell cranks 125 and 127 carry studs 134 and 135, respectively which support a link 136. Link 136 is the controlling member of a parallelogram linkage by means of which the analyzing frame may be elevated and lowered in a straight line movement, insuring the passage of the analyzing brushes through the correlated perforations. While the specific description has been confined to the supporting structure of one side of the analyzing support frame shown in Figs. 2 and 3, the same type of support is provided for the other side of said frame as is shown in Fig. 1 wherein controlling link 137 designates the controlling member for the parallelogram linkage for the other side of said frame.

Shifting of the links 136, 137 in one direction or the other to elevate or depress the analyzing frame is effected by respective follower arms 138 (Fig. 2) and 139 (Fig. 1) which are pivoted on the shaft 30 and operated by respective complementary cams 140 secured to the drive shaft 31. The connection between the follower arm 138, 139 and the respective controlling member link 136, 137 consists of an open notch 141 on the follower arm receiving a stud 142 carried by the related link 136, 137. This open notch and stud connection makes it unnecessary to remove pins or studs to effect a disconnection in the operating train when elevating the upper section of the card feeding unit.

*Means to effect sliding contact of analyzing brushes*

While the movement of the frame downwardly exerts pressure on the flexible wire brushes 109 to cause them to project through the perforations as shown in Fig. 9*b* and make firm electrical contact with commutator contact points, it is desirable to effect a slight lateral movement of the frame 111 so as to wipe the brushes over the card and if they project through a perforation to make contact with the commutator contact point it will wipe the brush thereover to make an efficient electrical contact. This is preferably effected by a lateral displacement of the frame 111 slightly to the right concurrently with the vertical depression of the frame to provide a resultant inclined movement of a brush which will cause it to make contact, and also bend the brush and wipe it over the contact point, from the Fig. 9*b* to Fig. 9*c* position. To effect this there is secured to drive shaft 48 a pair of cams 150 (Figs. 1 and 4), each of which operates a bell crank follower arm 151 loosely pivoted on the shaft 43. The upper arm of said bell crank has an open notch 152 which receives a stud 153 carried by the frame 111 and which projects through a notch 154 in the side frame 15. 154 is a clearance notch. The open notch 152 in the arm facilitates the connection and disconnection of the operating train now being described whenever the upper section of the unit is raised or lowered.

Recapitulating the preceding description of the lowering of the frame and the wiping of the brushes over the card, it is evident that the parallelogram structure provides for only a vertical movement of the brushes and a full vertical movement in this direction which is started at 330° (see Fig. 11), after a card has been fed, might cause one of the brushes to dig in the wall of a perforation while bending. Thus, either the card would be moved forward or the brush would be damaged.

From Fig. 11, it will be seen that a displacement of the brushes to the right starts at 342° after a slight downward vertical depression of the frame, and by the combination of two motions provided by a further downward movement and lateral movement given to the analyzing frame between 342° to 360° the frame moves in a resultant inclined direction or line AA of Figs. 9*a*, 9*b*, 9*c*. The combination of the two motions causes one of the brushes to move in an inclined direction, then bend, and a brush to be wiped over the related contact point through a perforation, the wiping movement bringing a brush from the Fig. 9*b* position to the Fig. 9*c* position. Of course, as a brush bends the ends of the strands move slightly to the forward or left as in Fig. 9*b* but not sufficiently to dig into the wall of a card perforation wall. The wiping of the brush over the contact point balances this forward movement. The latter position in Fig. 9*c* is maintained during the card readout operation.

At about 183° after the card readout operation, the cams 140 cause the upward movement of the analyzing frame which is effected vertically due to the parallelogram structure. In the vertical movement of the analyzing frame the brushes unbend from the Fig. 9*c* position, but the ends of the brushes do not move sufficiently to dig into the wall of a perforation if encountered.

At 250° cams 150 will be effective after the brushes are way above the card to shift the analyzing frame laterally to the left, restoring it to its normal starting position.

*Pressure plate*

It is desirable to provide a pressure plate which clamps or holds the card against the bed at each station prior to the lateral shifting movement of the analyzing frame. Reference has been made to the shifting movement of the frame 111 to the right as viewed in Fig. 3 for the purpose of flexing the brushes and shifting them slightly laterally to make firm electrical contact. Such movement through frictional contact between the brushes and card surface tends to shift the card in the same direction against the card stops 101 and 103 and, to eliminate the possibility of buckling the card or a shift from the correct analyzing position of the card, means is incorporated to prevent this deleterious action by positively clamping the cards at both stations before the brushes are shifted.

Referring to Figs. 3, 9 and 10, there is provided a plurality of bars 160, 161 and 162 which are transversely of the card feeding unit, that is, they are parallel to the horizontal rows of index points of the card. Each of the bars 160, 161 and 162 is carried by the frame 111 by having the heads of screws 163 carried by the frame 111 fit in oval shaped notches 164 of the bars 160, 161, 162. The slot 164 is elongated or oval in shape to permit the movement of the frame 111 independent of the pressure plate when said frame is slightly shifted laterally for the purpose of shifting the brushes. The width of the slot 164 is substantially the same as the diameter of the shank of the supporting screw stud 163. To the bars 160, 161, 162 the pressure plate 165 is attached by a number of recessed screws 166 and said plate is substantially the same shape externally as the frame 111 and is provided at each station with a rectangular cutout portion 167 through which project the brush units for each station. The portions of the pressure plates 165 which clamp or press the card against the bed of the unit engage the leading edge of each card, that is to say, the horizontal edge adjacent the 9 index point position.

The pressure plate 165 is preferably made of aluminum, anodized and glyptal coated, to provide a high degree of di-electric strength in order to avoid ground or short-circuiting between adjacent brushes if they should accidentally make contact therewith. When the brush holder frame 111 is in the normal upper position the lower surface of the pressure plate 165 is arranged to be $\frac{1}{32}$ inch above the upper surface of the bed to provide space for entry of the card. When the card has been fed into position by the grippers and properly aligned, the brush carrying frame 111 moves down and after the frame has moved $\frac{1}{32}$ inch the plate 165 firmly presses against the card, squeezing it between the pressure plate and card bed and holding it in a fixed position. As the brushes move farther down and the frame 111 is shifted slightly laterally, the cards at the two analyzing stations will be positively held to avoid any shift from the desired position for analysis.

It is obvious that the oval shaped slot 164 in cooperation with the head of the screw 163 will enable the brush support frame 111 to be moved laterally independently of the pressure plate.

It has also been found desirable to put spring tension on the pressure plate 166 and preferably at each side which is in alignment with the shorter marginal edges of the cards. There is pivoted, on each bracket 170 carried by the frame 111 (Figs. 7*a* and 10), by stud 171 an arm 172 which has a pin and slot connection 173 to the related cross bar 160, 161, 162. Arm 172 has an upstanding extension 174 to which a tension spring 175 is secured. This arrangement is provided in triplicate for each side of the pressure plate 165 as shown in Fig. 10 and, therefore, these springs 175 act to force the pressure plates 165 downwardly. The desired tension of these springs gives the desired clamping force necessary. When the pressure plate is moved upwardly by the return of the brush carrying frame 111, arms 172 are rocked to their normal position so that the initial tension in the spring 175 will be effective for the clamping action.

*Sensing commutators*

Readout devices of a commutator arrangement are provided for reading out the perforations analyzed to thereby transmit differentially-timed digit-representing impulses. The present sensing commutator arrangement is such that it is intimately structurally coordinated with the analyzing brushes so as to occupy a minimum of space and is individual to each column to eliminate the possibility of back circuits.

In general, the sensing commutator for each order comprises a stator in the form of a commutator 180 and a related rotor 181 (Figs. 3, 7 and 9). The commutator 180 is constructed substantially in the same manner and by the method disclosed in the application of G. A. Giannuzzi et al., Serial No. 575,916, filed February 2, 1945, now Patent No. 2,411,210. Each commutator unit 180 consists of an intermediate metal sheet 182 and sheets of insulating material 183 cemented at each side of the metal sheet. The method described in the aforementioned application provides a commutator unit of a width corresponding to the distance between vertical columns of perforations and also provides a series of insulated commutator points 189, there being twelve of these for each set of analyzing brushes. The center metal piece 182 extends at each side at 184 beyond the sheets of insulating material 183 and cooperates with narrow slots 184 formed in mounting bars 185. By thus fitting in the slots in the bars 185 the commutator units are correctly positioned laterally in alignment with the card columns and the analyzing units. Commutator points 189 designated 9—1, O, X, R are insulated from each other by filled-in insulating material 186 and the upper ends of said commutator points 189 and sheets 183 are machined to provide a smooth surface, whereas the lower portions of the commutator points 189 project downwardly beyond the insulating material 186 and sheets 183 so as to provide projecting commutator points with which a wiper of a rotor cooperates. Since there are eighty commutator units 180 for each analyzing station and are adjacently and closely mounted, the smooth surface of the top of each commutator, forms, when all of the commutator units are assembled together, a smooth bed surface over which the cards can be fed without abutting any projecting surfaces. The gap between the bed surfaces formed by the commutator units for two stations over the center support bar 185 (Fig. 3) is filled in by a plate 187 (Figs. 3 and 9) which is flush with said bed surface. Also at each side of each analyzing station there is provided similar guide plates 188 and 189 (Figs. 3 and 9).

In order to further hold the commutator units in assembled position there is provided a plurality of bars 190 (Fig. 9) formed with spaced ears 191 between which upper portions of alternate commutator units 180 may fit.

From Figs. 3 and 9 it is evident that the left end of pressure plate 165 presses the leading edge of one card against the upper surface of the commutator units 180 and also the plate 188, whereas the central part of pressure plate 165 presses the other edge of the card against the surface of the commutator units and also the plate 187.

From Figs. 3 and 9 it is evident that the lower portions of the commutator points 189 are concentrically arranged, and associated with the contact points of each commutator unit 180 is a rotor and for each analyzing station the rotor assembly is driven either by the shaft 30 or 43 one-half revolution for each machine cycle.

The rotor associated with the commutator units comprises a metal casting 200 (Fig. 9) which is secured to the drive member 28b (or a similar member attached to gear 28) through disks 201 (Fig. 7) which are of insulating material. Disks 201 may be bearing supported by the respective drive shaft in any suitable manner. Mounted on a related rod 202 carried by casting 200 (Fig. 9) and guided by slots 203 are wipers 204. Each wiper 204 has a contact portion 205 and is urged by a spring 206 to engage with the contact points 189 in succession. There are eighty wipers 204 mounted on each rod 202, and thus one hundred and sixty in the aggregate on each rotor assembly.

In the position shown in Fig. 9 the rotor, as it rotates clockwise, causes the contact portion 205 to make contact with contact points 189 in the order 9—1, O, X, R. One side of the line may be connected to the rotor assembly 200 in any suitable manner, such as a collector ring 209 (Fig. 7) and a brush 210 connected to one side of the line, the electrical circuit being then extended by the "live" contact point 189 engaged by wiper 204, the contacting brush 109, the brush unit 112, and then to some electrical work control magnet. The sets of wipers 204 alternately make contact with the contact points 189 since sleeve 200 is only given one-half revolution.

Each commutator unit has additional insulated metal inserts 207, 208 (Fig. 9). With these it is possible to have a circuit breaker close the circuit and supply current to the "9" point 189 when the wiper contact portion 205 bridges the extension 189 and insert 208. Similarly, at the end of the cycle it is possible to hold the circuit closed as contact portion 205 leaves the "R" contact point 189 at a time when it will be just touching the insert 207. Also insert 208 retains the wiper contact portion 205 outwardly as it passes from 182 to the "9" point, and insert 207 from the "R" point to 182. Thus, the possibility of wiping away intermediate insulating material, if inserts 207, 208 were not provided is eliminated.

Secured to each of the main tie bars 185 is a bar 192 (Figs. 3 and 9) which is provided with a surface 193 which is tangent to the concentric contacting surface of the commutator unit 180. These bars are hardened at such surfaces to provide a means to engage with the wiper contact portion 205 to cam them down into correct position before they strike the softer beryllium copper contact surfaces 207, 208 or the contact points 189 in order to protect entering surfaces and eliminate wear.

While there have been shown and described and pointed out the fundamental novel features of the invention, as applied to a preferred embodiment, it will be understood that various omissions and substitutions and changes in the form and details of the device illustrated and in its operation may be made by those skilled in the art without departing from the spirit of the invention. It is the intention, therefore, to be limited, ony as indicated by the scope of the following claims.

What is claimed is:

1. An analyzing arrangement for a machine controlled by a perforated record provided with columns of index points comprising, a brush holder for each card column carrying a plurality of flexible index point analyzing brushes projecting angularly with respect to the surface of the card to be analyzed for simultaneously analyzing all index point positions in a column, a movable frame carrying a plurality of brush holders, means for moving said frame to analyzing position to simultaneously analyze a plurality of columns of index points, clamping means carried by the frame for clamping the card against a fixed surface, a plurality of columns of contacts, one column of contacts for each brush holder, means for effecting a lateral shift of said frame less than the length of a perforation in a wiping direction to cause the analyzing brushes to wipe over said columns of contacts through the holes analyzed, and means for carrying said clamping means by said frame comprising connections which enables the lateral shift of said frame independent of said clamping means, whereby the card is clamped in analyzing position during the lateral shift of the frame to prevent the movement of the card which may be effected by the friction between the brushes and the card surface.

2. An analyzing arrangement for a machine controlled by perforated cards provided with columns of index points comprising an analyzing brush holder carrying a plurality of projecting analyzing brushes for analyzing the column of index point positions, each brush holder being provided with a semi-circular notch at each end thereof, a reciprocable support frame for a plurality of brush holders, a pair of guide bars of insulating material carried by said frame and each having parallel slots for receiving both ends of said brush holders to space them apart, and each guide bar having a semi-circular notch intersecting said slots, and a plurality of locking bars each fitting complementarily into the semi-circular notches of the same ends of a plurality of brush holders and the notch in the related guide bar for securely locking each brush holder at both ends in assembled spaced position on said frame.

3. An analyzing means for analyzing index points of a perforated record comprising a movable frame, a plurality of analyzing brushes carried by said frame but movable independently thereof which are arranged in columns for analyzing the associated columns of index points while the card is stationary, a bed surface over which the record is disposed for analysis carrying for each column of brushes a series of contact elements, each of which is contacted by the related brush through the perforation, said contact elements being successively read out for the transmission of an electrical impulse representative of the perforation sensed, and separate actuating means for said frame and said brushes for first moving said frame downwardly and said brushes independently laterally to effect a conjoint movement in a manner to cause the brush to bend as it contacts the related contact element through the perforation and cause said brush to wipe over said contact element to make good contact therewith and to prevent the brush from digging into the wall of the perforation as it bends, said actuating means for the frame causing said frame to be retained in its downward analyzing position during the time the contact elements are successively read out.

4. The arrangement claimed in claim 3 wherein after the contact elements are successively read out the actuating means for said frame thereafter elevates said frame and brushes, whereby said brushes due to their lateral position may unbend without digging into the walls of the perforations, and said actuating means for the brushes restores them to their normal position.

5. The arrangement claimed in claim 4 wherein said frame comprises a parallelogram brush structure supporting means, and said frame actuating means actuates said structure to effect the downward and elevating movements in substantially a vertical direction.

GEORGE F. DALY.

REFERENCES CITED

The following references are of record in the file of this patent:

UNITED STATES PATENTS

| Number | Name | Date |
|---|---|---|
| 1,741,992 | Kleckler | Dec. 31, 1929 |
| 2,182,006 | Tauschek | Dec. 5, 1939 |
| 2,258,290 | Johnstone et al. | Oct. 7, 1941 |
| 2,269,984 | Cleven | Jan. 13, 1942 |
| 2,320,836 | Tauschek | June 1, 1943 |
| 2,395,557 | Leathers | Feb. 26, 1946 |